United States Patent [19]
Medina

[11] Patent Number: 5,918,534
[45] Date of Patent: Jul. 6, 1999

[54] COOKING SPIT WITH HEAT TRANSFER MEANS

[76] Inventor: Henry Medina, 4 Sleepy La., Melville, N.Y. 11747

[21] Appl. No.: 09/112,118

[22] Filed: Jul. 8, 1998

[51] Int. Cl.⁶ .............. A47J 37/04; A22C 7/00; A23L 1/00
[52] U.S. Cl. .............. 99/342; 99/419; 99/421 A; 99/421 H; 99/427; 99/442
[58] Field of Search .......... 99/342, 419–421 V, 99/427, 382, 442, 483, 343; 219/401, 400, 523, 530, 227, 533, 540, 396, 407, 521, 385; 165/104.21, 185, 80.5; 426/391, 497, 521, 520, 466, 644, 523; 392/451, 459; 126/369, 20, 41 B; 62/51.1, 62

[56] References Cited

U.S. PATENT DOCUMENTS

| | | | |
|---|---|---|---|
| 1,802,532 | 4/1931 | Pulver | 426/391 |
| 1,979,501 | 11/1934 | Stepkin | 219/396 |
| 2,648,275 | 8/1953 | Thompson | 99/419 |
| 2,835,480 | 5/1958 | Perez . | |
| 2,918,561 | 12/1959 | Perez | 219/523 |
| 3,377,943 | 4/1968 | Martin | 99/419 |
| 3,379,118 | 4/1968 | Perez . | |
| 3,635,146 | 1/1972 | Aubert | 99/339 |
| 3,709,141 | 1/1973 | Schwartzstein | 99/343 |
| 3,899,657 | 8/1975 | Johnson | 219/523 |
| 3,965,808 | 6/1976 | Chomette | 99/419 |
| 3,980,010 | 9/1976 | Collinucci . | |
| 4,506,598 | 3/1985 | Jovanovic | 219/401 |
| 4,715,273 | 12/1987 | Riesselmann . | |
| 4,810,856 | 3/1989 | Jovanovic . | |
| 5,057,331 | 10/1991 | Levinson | 426/523 |
| 5,173,320 | 12/1992 | Stuck et al. | 426/523 |
| 5,301,602 | 4/1994 | Ryczek | 99/345 |
| 5,586,489 | 12/1996 | Fraga . | |
| 5,662,028 | 9/1997 | Fraga . | |
| 5,690,980 | 11/1997 | Fraga . | |

*Primary Examiner*—Timothy F. Simone
*Attorney, Agent, or Firm*—Scully, Scott, Murphy & Presser

[57] ABSTRACT

A cooking spit including a heat transfer arrangement for the cooking or roasting of foods, especially such as fowl or other types of meats, wherein the cooking spit is adapted to be rotated as a component of a rotisserie. More particularly, there is provided a heat transfer fluid medium incorporated into the hollow interior of the cooking spit and which is adapted to provide a source of convective heat for assisting in internally cooking the food, and also a coolant upon cooling of the spit.

18 Claims, 2 Drawing Sheets

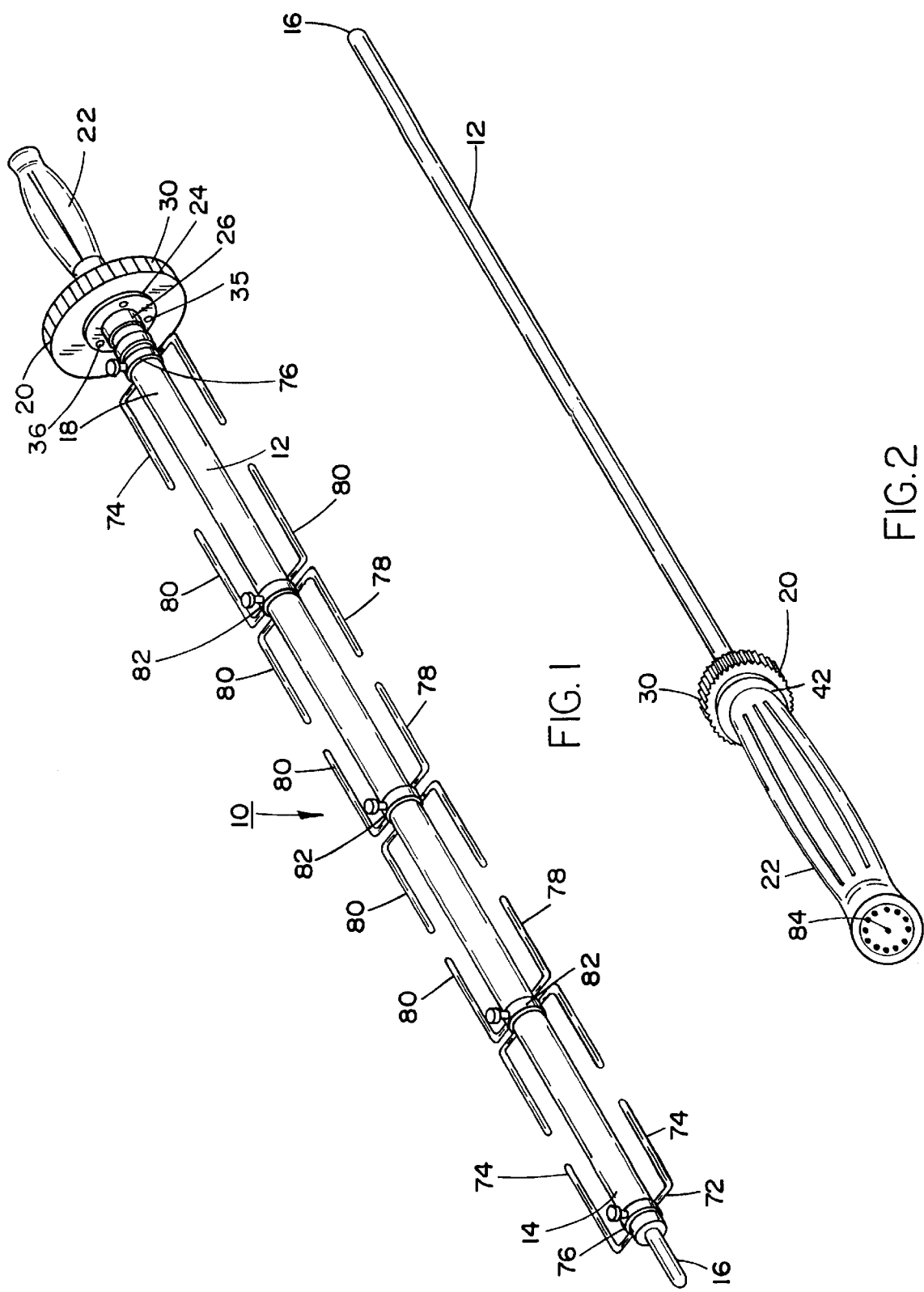

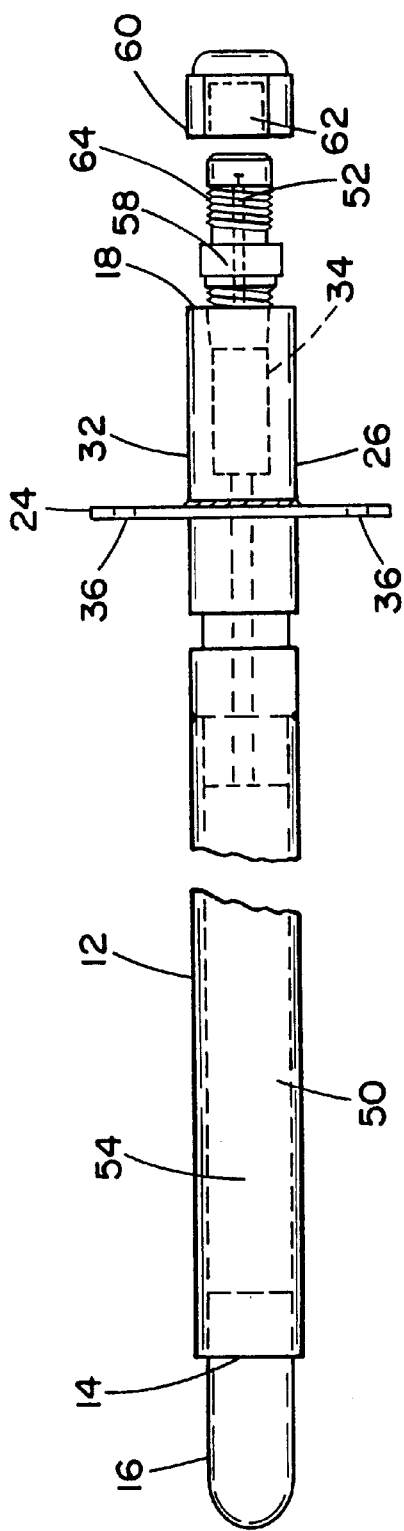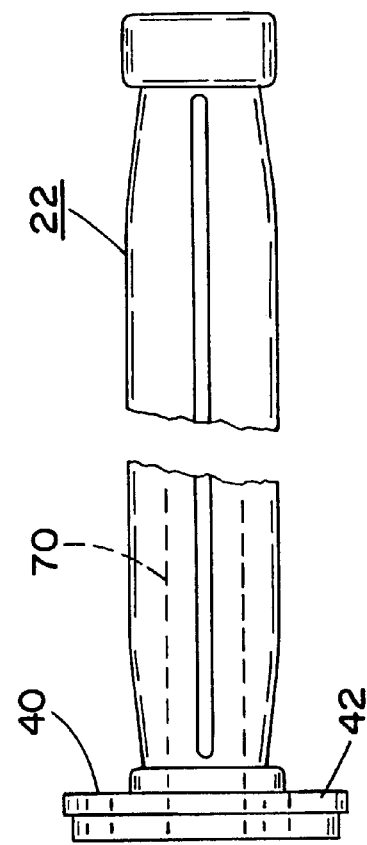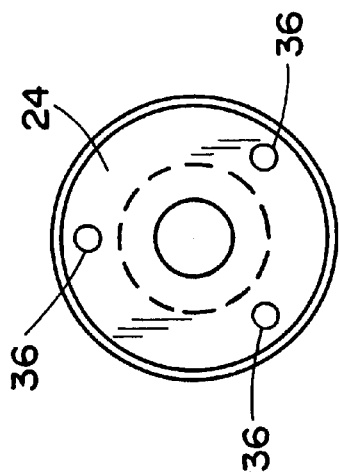

COOKING SPIT WITH HEAT TRANSFER MEANS

BACKGROUND OF THE INVENTION

1. Field of the Invention

The present invention relates to a cooking spit including a heat transfer arrangement for the cooking or roasting of foods, especially such as fowl or other types of meats, wherein the cooking spit is adapted to be rotated as a component of a rotisserie. More particularly, the invention is directed to the provision of a novel heat transfer structure incorporated into the cooking spit and which is adapted to provide a source of heat for assisting in internally cooking the food.

The utilization of cooking spits for the support of various types of food, especially fowl or poultry and meats during cooking or roasting thereof is well known and has been developed over many years, in fact dating back to ancient and even prehistoric times. Ordinarily, the food is exposed to a source of external heat while being rotated on the cooking spit so as to essentially uniformly distribute the cooking or roasting effect of the heat over the external surface of the food.

In recent years, based on economic reasons, there has been developed the concept of the rapid preparation of cooked foods, such as poultry or meats, especially in so-called highly-competitive fast food restaurants or quick service and take-out establishments, in which large quantities of prepared cooked foods, such as meats and poultry, and particularly chickens, are served to large numbers of customers within short periods of time. Consequently, the time constraints which are encountered in having to prepare and cook the chickens and meats require that the cooking times be reduced so as to be able to cook or roast in a more rapid and economically efficient manner, while concurrently taking cognizance of hygienic demands which necessitate that the foods be cooked through to an acceptable degree of doneness. For instances, governmental agencies promulgate directives and health-related regulations which are intended to regulate cooking aspects and also concern themselves with meat and poultry inspection, have a direct bearing on the retail sales of such cooked food items, especially with regard to chickens and other meats wherein an increased incidence of pathogenic bacteria cause contamination resulting in food-borne illnesses, and are of major concern in the food service industry.

The U.S. government has proposed changes in the manner in which meats and poultry (among other food items) are inspected to increase information concerning the growth of bacteria, and scientific measures employing new techniques and other safeguards are being implemented in order to be to able discover dangerous microbes and bacteria which have been appearing in meats and poultry at increased frequencies and which are deemed to be responsible for the deaths of many humans and are the cause of serious food-related illness.

Thus, the possibility of the presence of threatening contaminants; for instance, *E-coli* bacteria, mandate the implementation of safety procedures for the cooking and processing of various food products, and particularly readily contaminatable poultry, such as chicken. The bacterial contamination of chicken and meats, amongst other types of food items, can be readily counteracted if these particular food products are well cooked and rapidly cooled. It has been evidenced that many food service personnel, including restaurant owners and managers of fast food outlets, supermarkets and the like, are not fully aware that the inadequate cooking of chickens or meat may result in the presence of dangerous bacteria, and that well cooked or roasted meat or chicken products are basically the only guarantee of killing dangerous bacteria.

Pursuant to current regulations, the Food and Drug Administration (FDA) and the U.S. Department of Agriculture require that potentially hazardous foods, such as poultry and meats be cooked to a throughout degree of doneness of within about 170° F. to 190° F., inasmuch as heat-resistant bacteria which may be the cause of food poisoning can propagate up to temperatures of about 150° F.

Although foods such as chickens or meats, when roasted, either in cooking installations, such as stationary ovens or rotisseries can evidence the desired degree of doneness about the exterior surface portions of the meat or chicken, quite often the center or interior portion of the meat or the cavity region of the chickens are only partially cooked or done to a degree which does not meet the required standards; in effect, 170° F. to 190° F. In an attempt to provide through-cooked poultry or meats, there have been developed sources of heat which will enhance the cooking of the internal or cavity portions of chickens and other poultry or fowl, or the center portions of meats, such as roasts, so as to meet the current food safety standards which have been or are being promulgated by various government regulatory agencies.

2. Discussion of the Prior Art

For example, diverse types of heat-generating and transfer devices and arrangements have been developed in the technology concerned with the cooking or roasting of meat and poultry products, and such as chickens which are readily subject to high degrees of bacterial contamination, wherein the devices are adapted to provide an enhanced degree of heating and cooking to the interior portions of these food products so as to more closely conform to safety regulations affecting the health of consumers and concurrently shortening cooking times while maintaining the flavor and integrity of the cooked product.

Fraga, U.S. Pat. No. 5,690,980 discloses an apparatus for the cooking preparation of fowl or poultry wherein a heat transfer element which substantially conforms in shape with the cavity of the dressed fowl, when inserted into the cavity during the roasting or cooking of the fowl will provide a heat transfer surface contacting the interior surface of the fowl, which is adapted to cause the interior of the fowl to be initially seared to seal in the meat juices, and thereafter cooked to a desired degree of internal doneness.

Fraga, U.S. Pat. No. 5,662,028, which is an improvement over Fraga, U.S. Pat. No. 5,690,980, discloses the internal heat transfer member, which conforms generally to the shape of the interior cavity of the fowl, to be of a hollow construction, and wherein the hollow of the member incorporates a further rod-shaped heating element including electrically-heated coils which are adapted to generate a higher degree of heat radiating outwardly so as to assist in the cooking or roasting of the interior portion of the meat or fowl.

Fraga, U.S. Pat. No. 5,586,489 is also similar to Fraga, U.S. Pat. No. 5,690,980, and particularly relates to the shaped heat transfer member which conforms with the cavity of a fowl, such as a chicken or the like, and which is adapted to be rotated in the form of a cooking spit as a constituent of a rotisserie.

Jovanovic, U.S. Pat. No. 4,810,856 discloses a cooking apparatus including a rotary spit, having a gear-driven rotation-imparting apparatus in the form of a rotisserie, and wherein a fowl or chicken which is mounted on the rotating spit and impaled by forks is adapted to be slowly rotated while internal heat in the form of steam vapor is applied to the cavity of the chicken by means of a steam generating unit.

Riesselmann, U.S. Pat. No. 4,715,273 discloses a rotisserie-type apparatus wherein a fowl or chicken is adapted to be mounted on a short cantilever-mounted spit and rotated so as to provide for more uniform heating throughout, particularly through the provision of a heater element which is electrically heated and inserted within a hollow rod of the spit mounting the chicken.

Collinucci, U.S. Pat. No. 3,980,010 discloses a cooking spit which has an electrically heated open-ended tabular portion, and wherein electrical coils are adapted to provide radiant heat for cooking the interior of a food product, such as a fowl.

Finally, Perez, U.S. Pat. Nos. 3,379,118 and 2,835,480 disclose, respectively, either a baking rack with pin members arranged in an upstanding array within a roasting pin for baking potatoes or the like; or wherein a thermal pin is adapted to be inserted into roast meat arranged in roasting a pan of a cooking oven. In these particular instances, Perez '118 discloses the thermal pins to be of hollow construction including a sealed cavity having a vaporizable liquid therein, which may be, for example, water or Freon, and which will provide for heat transfer for either heating of the pins or imparting a cooling action when the temperature is lowered so as to allow for an enhanced temperature control over the interior of the food product mounted on the pins, with resultant reduction in cooking times.

Similarly, Perez, U.S. Pat. No. 2,835,480 discloses hollow thermal pins which include a fluid in a form of vaporizable liquid to impart heat transfer properties along the length of the pins and also for the cooling, as desired, depending upon hot or cold temperature conditions.

Although the foregoing apparatus and devices concern themselves to a considerable extent with the uniform cooking and controlled internal heating and/or cooling of food products, particularly such as meats or poultry, in the form of chickens or the like, and which allow for a higher degree of uniformity and more rapid cooking of the interior of the product, there is no disclosure of employing a vaporizable heat transfer fluid sealing contained in a hollow cooking spit which is adapted to form a rotatable constituent of a rotisserie, and wherein the vaporizable heat transfer fluid will provide for an enhanced degree of cooking of the interior of the chicken or meat which mounted on the cooking spit, and wherein the novel construction of the cooking spit with the therein contained vaporizable liquid facilitates the utilization of the cooking spit in numerous diverse facilities, and especially with regard to fast food operations.

SUMMARY OF THE INVENTION

In order to attain the foregoing advantageous cooking and/or roasting conditions, particularly for poultry and meats, pursuant to the invention there is provided a novel and rotatable cooking spit which comprises an elongated hollow stainless steel rod having a sealed cavity extending therein substantially the full axial length of the rod, and which contains a vaporizable heat transfer fluid. The fluid, which is liquefied at low or ambient temperatures, upon being heated vaporizes and generates heat in conformance with external temperature conditions imparted to the rod, so as to assume a gaseous state along the length of the cavity and producing heat transfer conditions which will enhance in the cooking of the interior of the meat or poultry food item which is mounted on the cooking spit. Conversely, upon the temperature lowering causing cooling of the meat or poultry mounted on the spit, the vaporized fluid will revert into a liquid state and essentially become a coolant; for example, such as a refrigerant as is employed in a refrigeration system, thereby producing a rapid cooling down of the food item.

Pursuant to a novel embodiment of the invention, the elongated rod element of the cooking spit is equipped at one end thereof with a gear and an insulating handle. This facilitates the positioning of the rotatable cooking spit in a rotisserie, and enables the rotation about the longitudinal axis thereof through the intermediary of a drive system engaging the gear, as is well known in many current fast food and supermarket rotisserie installations, particularly those which are employed in the roasting of chickens and similar meat products. In accordance with a particular aspect, the stainless steel rod may be designed in various sizes; in effect, different diameters and lengths to be able to be retrofitted to specific (commercial) rotisserie installations, such as for either simultaneously cooking or roasting a plurality of chickens or meats or in smaller sizes to be able to be accommodated in small rotisseries or barbeques for single chickens, as may be employed for domestic or home use.

Accordingly, it is an object of the present invention to provide a novel cooking spit incorporating heat transfer means for the improved roasting or cooking of meat and poultry products.

A more specific object of the present invention is to provide a novel cooking spit incorporating an internal heat transfer arrangement for enhancing the cooking or roasting of internal portions of a meat product or the cavity region of poultry, such as chickens.

Yet another object of the invention resides in provision of a cooking spit having a hollow elongated stainless steel rod element for mounting meat or poultry product, which rod element includes a sealed cavity extending substantially the length of the hollow rod element and contains a quantity of a vaporizable heat transfer fluid which is adapted to gasify in order to assist in the cooking of food which is mounted on the spit when exposed to heat, or conversely, when cooled to assume a liquefied state to assist in a rapid cooling of the arranged on the cooking spit.

BRIEF DESCRIPTION OF THE DRAWINGS

Reference may now be had to the following detailed description of a preferred embodiment of a cooking spit pursuant to the invention, taken in conjunction with the accompanying drawings; in which:

FIG. 1 illustrates a perspective view of the cooking spit pursuant to the invention, mounting a plurality of forks adapted to piercingly engage a quantity of chickens or meat items impaled on the spit;

FIG. 2 illustrates a perspective view of the cooking spit shown without the food piercing forks, as viewed from the opposite end thereof;

FIG. 3 illustrates a longitudinal view of the elongated hollow stainless steel rod of the cooking spit;

FIG. 4 illustrates a side view of the insulating handle which is adapted to be attached to the cooking spit; and FIG. 5 illustrates an end view of the insulating handle showing the flange for attaching a spit rotating gear thereto.

DETAILED DESCRIPTION OF A PREFERRED EMBODIMENT

Reverting to FIG. 1 of the drawings, there is illustrated a cooking spit 10 constructed pursuant to the invention, which comprises an elongated metal rod 12 of generally hollow construction adapted to contain a fluidic heat transfer medium therein as described hereinbelow, and which may be a constituent of a rotisserie (not shown) for cooking and/or roasting meats, poultry or the like.

One end 14 of the hollow elongated metal rod 12 is provided with a tip 16 of solid metallic construction, and may be cylindrical in shape so as to form a bearing journal for the cooking spit, and is adapted to sealingly close off one end of the hollow interior of the metal rod 12. The opposite end 18 of the elongated rod 12 incorporates structure for mounting a gear 20 engageable by drive structure (not shown) for rotating the spit, and an insulating handle 22 attached thereto which will facilitate manipulation or handling of the entire spit structure 10 by a user.

Adjacent the end 18 of the rod 12 mounting the insulating handle 22, as is illustrated in FIGS. 3 to 5 of the drawings, a flange 24 is mounted on a sleeve portion 26 of the elongated rod, adjoining which there may be positioned the gear 20 in face-to-face side surface contact, the gear 20 being a spur gear having peripheral gear teeth 30 adapted to be engaged by a gear drive unit (not shown) for rotating the cooking spit 10 during the cooking or roasting operation of a rotisserie or the like.

The insulating handle 22 is mounted onto a sleeve 32 having a hollow blind hole 34 therein, and suitable fasteners 35 may be passed through apertures 36 extending through the flange 24 at the end 18 of the rod 12 and through therewith aligned holes formed in the gear 20, and through suitable further therewith aligned holes 40 formed in a flange 42 on the insulating handle 22 in contact with the opposite side of the gear 20, as may be ascertained from FIGS. 4 and 5 of the drawings.

The gear 20 and the insulating handle 22 may each be formed from a suitable plastic material, preferably such as molded nylon, or high impact molded plastic or the like, although other heat insulating materials may be readily employed in connection with this structure.

As is illustrated in FIG. 3 of the drawings, the elongated rod 12 includes a hollow interior space 50 or the cavity extending substantially along a major portion of the length thereof. Proximate the end 18 at which the gear 20 and insulating handle 22 is mounted, the elongated metal rod 12 is equipped with a valve arrangement 52 for evacuating air from the interior space or chamber 50 of the elongated rod 12, and thereafter facilitating the introduction of a suitable quantity of a vaporizable liquified heat transfer fluid 54 for example, such as is produced and commercially sold by DuPont under the designation HFC 134A. Upon the requisite quantity the vaporizable fluid having been introduced into the space or cavity 50 of the cooking spit rod 12 through an inlet or feeder valve 58 a seal cap 60 having an internal screwthread 62 is positioned over the valve arrangement 52 having a complementary external screwthread 64, so as to close off the latter in a sealing manner. The valve arrangement 52 may be of the type as is employed in air-conditioning systems, and may be manufactured by Schrader-Bridgeport International, Inc. Connecticut. However, other types and makes of valves may be readily employed in connection with the foregoing. Thereafter, the insulating handle 22, which as shown in FIG. 4 of the drawings, has an axial blind hole 70 therein positioned over the sealed valve arrangement 52 and seal cap 60 projecting from the gear and handle mounting plate or flange 24, such that the entire valve arrangement 52 is located hidden from the outside of the insulating handle 22 and thereby protected from any external influences.

Suitable metal forks 72 may be slidably arranged on the elongated rod 12 which forms the heat-transfer portion of the cooking spit 10, with the rod 12 preferably being constituted of AISI 304 stainless steel, which is essentially a food grade steel approved by the FDA.

The forks 72 which are each basically of a well-known construction, may be two-pronged forks of which the tines 74 extend in parallel spaced relationship with rod 12 so as to be able to pierce meats or chickens, with suitable clamps 76 fastening the forks 72 to the outer circumference of the elongated rod 12 in selected axial spacings. The center forks 78 may be double-forks having oppositely directed tines 80, and are each attached to a single dual clamp 82 so as to be able to save space when mounting a plurality of the food items on the cooking spit 10.

Although, diverse sizes and applications of the cooking spit 10 are contemplated with regard to the present invention; for example, the external diameter of the elongated rod 12 may be cylindrical and 0.625 inches, in size, with a wall thickness of about 0.065 inches.

During cooking or roasting operation at elevated temperature, the cooking spit 10 when introduced into the heated environment, such as in an oven or rotisserie, causes the heat transfer liquid in the cavity 50 of the rod 12 to vaporize into a gaseous phase extending throughout the cavity, and to practically instantaneously transfer heat along the entire length of the cooking spit cavity 50, and to assume a temperature reigning in the cooking oven or rotisserie, thereby providing for the rapid cooking of the interior portions of the meat or the cavity of the chicken which is mounted on the cooking spit. This heat transfer due to the medium in the cavity 50, to a considerable degree enhances the rapidity of cooking, and also concurrently ensures, that the interior of the meat is cooked or roasted to a desired degree of uniform doneness in conformance with that along the outer portions of the meat or poultry. The uniformity of cooking provided for by the present heat transfer arrangement ensures that there is present a uniform cooking without adversely influencing the flavor and appearance of the food item, while considerably shortening the required cooking time.

In order to provide an indication as to the degree of doneness in the cooking of the interior portions of the meat or the cavity region of the poultry or chicken, the insulating handle 22, as shown in FIG. 2 of the drawings, may be equipped with a suitable temperature indicator 84 which is informative of the temperature or at least the temperature range within the meat or poultry item in the close proximity with the surroundings about the cooking spit 10.

Based on the foregoing, it becomes readily apparent that the inventive cooking spit 10, in a simple and inexpensive manner, will provide for the required cooking/roasting environment interiorly of a food product, such as meats, chickens and the like, while being cooked on the spit, and with the spit 10 adapted to be readily retrofit on existing rotisserie installations or cooking apparatus without modification of the latter. The entire cooking spit construction is relatively simple in nature and inexpensive to manufacuture, while being imbued with a long service life.

While there has been shown and described what is considered to be a preferred embodiment of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A cooking spit comprising an elongated metal rod adapted to have food impaled thereon and being rotatably mountable in an apparatus for cooking the food; said spit comprising:

(a) an insulating handle fastened to one end of said elongated metal rod;

(b) said metal rod having a hollow interior defining a sealed chamber extending along substantially the length of said metal rod; and (c) a fluid heat transfer medium in said sealed chamber filling a portion of the volume of said chamber, whereby upon said metal rod mounting food being subjected to heat, said fluid medium at least partially vaporizing so as to generate heat radiating outwardly from said metal rod along the length thereof into interior parts of the food.

2. A cooking spit as claimed in claim 1, wherein said vaporized heat transfer fluid medium liquefies upon cooling of said metal rod and forms a coolant when said metal rod is exposed to sub-ambient temperatures.

3. A cooking spit as claimed in claim 1, wherein said fluid medium comprises a heating/cooling medium which assumes a gaseous or liquid state depending upon the temperature conditions reigning in said cooking spit sealed chamber.

4. A cooking spit as claimed in claim 1, wherein said insulating handle incorporates sensing means for indicating the temperature condition of said cooking spit.

5. A cooking spit as claimed in claim 1, wherein means for imparting rotation to said cooking spit about the longitudinal axis of said metal rod is arranged at the end of said rod proximate said insulating handle.

6. A cooking spit as claimed in claim 5, wherein said rotation imparting means comprises a gear adapted to operatively engage drive structure for rotating said cooking spit.

7. A cooking spit as claimed in claim 1, wherein said metal rod includes valve means communicating with said hollow chamber for evacuating air from said chamber and facilitating the introduction of heating/cooling fluid into said chamber.

8. A cooking spit as claimed in claim 7, wherein said valve means is located proximate the juncture between said metal rod and said insulating handle.

9. A cooking spit as claimed in claim 1, wherein said insulating handle is constituted of a molded plastic material.

10. A cooking spit as claimed in claim 9, wherein said plastic material consists of nylon.

11. A cooking spit as claimed in claim 6, wherein said gear is constituted of a molded plastic material.

12. A cooking spit as claimed in claim 11, wherein said plastic material consists of nylon.

13. A cooking spit as claimed in claim 1, wherein said metal rod is constituted of stainless steel.

14. A cooking spit as claimed in claim 13, wherein said stainless steel consists of a food grade AISI 304 stainless steel.

15. A cooking spit as claimed in claim 1, wherein said metal rod is cylindrical in cross-section.

16. A cooking spit as claimed in claim 15, wherein the outer diameter of said cylindrical metal rod is about 0.625 inches and said rod possesses a wall thickness of about 0.065 inches.

17. A cooking spit as claimed in claim 1, wherein a plurality of food engaging means are mountable on said metal rod securable against relative rotation therewith, said food engaging means being adjustable along the longitudinal axis of said metal rod for engaging foods of different sizes.

18. A cooking spit as claimed in claim 17, wherein each of said food engaging means comprises fork structure having tines for piercingly engaging the food; and mounting structure on said food engaging means for releasably clamping said food engaging means to said metal rod.

* * * * *